(12) United States Patent
Scharp et al.

(10) Patent No.: US 8,631,573 B2
(45) Date of Patent: Jan. 21, 2014

(54) PISTON FOR AN INTERNAL COMBUSTION ENGINE AND METHOD FOR ITS PRODUCTION

(75) Inventors: Rainer Scharp, Valhingen (DE); Matthias Seifried, Boesingen (DE)

(73) Assignee: MAHLE International GmbH, Stuttgart (DE)

( * ) Notice: Subject to any disclaimer, the term of this patent is extended or adjusted under 35 U.S.C. 154(b) by 71 days.

(21) Appl. No.: 13/136,590

(22) Filed: Aug. 4, 2011

(65) Prior Publication Data

US 2012/0037113 A1  Feb. 16, 2012

Related U.S. Application Data

(63) Continuation-in-part of application No. 13/065,511, filed on Mar. 23, 2011, now abandoned.

(30) Foreign Application Priority Data

Aug. 10, 2010 (DE) .......................... 10 2010 033 878
May 5, 2011 (DE) .......................... 10 2011 100 521

(51) Int. Cl.
*F02F 3/22* (2006.01)
*B23P 15/10* (2006.01)

(52) U.S. Cl.
USPC .................... 29/888.04; 123/193.6; 123/41.35

(58) Field of Classification Search
USPC ............ 123/193.6, 41.35; 29/888.04; 92/186, 92/222
See application file for complete search history.

(56) References Cited

U.S. PATENT DOCUMENTS

| 3,235,158 | A |   | 2/1966  | Hollander |
|-----------|---|---|---------|-----------|
| 3,596,571 | A |   | 8/1971  | Hill et al. |
| 4,532,686 | A | * | 8/1985  | Berchem ................... 29/888.04 |
| 4,702,405 | A | * | 10/1987 | Thomson et al. ............. 228/2.3 |
| 4,735,353 | A |   | 4/1988  | Thomson et al. |
| 5,309,818 | A | * | 5/1994  | Mendes et al. .................. 92/176 |
| 6,155,157 | A |   | 12/2000 | Jarrett |

(Continued)

FOREIGN PATENT DOCUMENTS

| DE | 101 28 737 A1    | 1/2003  |
|----|------------------|---------|
| DE | 10 2004 019 012  | 11/2005 |
| JP | 2003-025076 A    | 1/2003  |
| WO | WO 2007/128265   | 11/2007 |

OTHER PUBLICATIONS

DIN EN 10083, Jan. 2007.
DIN EN 10267; Feb. 1998.

(Continued)

*Primary Examiner* — M. McMahon
(74) *Attorney, Agent, or Firm* — Collard & Roe, P.C.

(57) ABSTRACT

A method for the production of a piston has the following method steps: (a) providing a blank of a piston base body, having an outer joining surface, an inner joining surface and a circumferential lower cooling channel part that runs between the two joining surfaces, (b) providing a blank of a piston ring element, having an outer joining surface, an inner joining surface and a circumferential upper cooling channel part that runs between the two joining surfaces, (c) forming a circumferential widened region on at least one joining surface, the widened region extending toward the related cooling channel part, (d) connecting the blank of the piston base body with the blank of the piston ring element by way of their joining surfaces, by friction welding, to produce a piston blank, and (e) machining the piston blank further and/or finish-machining it to produce a piston.

8 Claims, 4 Drawing Sheets

(56) References Cited

U.S. PATENT DOCUMENTS

| | | |
|---|---|---|
| 7,918,155 B2 * | 4/2011 | Lapp et al. ............... 92/231 |
| 2006/0207424 A1 * | 9/2006 | Gaiser .................... 92/222 |
| 2007/0079775 A1 * | 4/2007 | Lin et al. ................ 123/41.35 |
| 2008/0127818 A1 * | 6/2008 | Dye ....................... 92/186 |
| 2009/0220820 A1 | 9/2009 | Kolbe et al. |
| 2010/0108016 A1 * | 5/2010 | Scharp et al. ........... 123/193.6 |
| 2010/0275873 A1 * | 11/2010 | Gniesmer et al. ........ 123/193.6 |
| 2011/0030645 A1 * | 2/2011 | Rebello et al. .......... 123/193.6 |
| 2011/0132971 A1 | 6/2011 | Kolbe et al. |
| 2011/0197845 A1 * | 8/2011 | Flowers et al. .......... 123/193.6 |
| 2012/0037111 A1 * | 2/2012 | Scharp et al. ........... 123/193.6 |

OTHER PUBLICATIONS

International Search Report of PCT/DE2011/001566, Feb. 23, 2012.

\* cited by examiner

PISTON FOR AN INTERNAL COMBUSTION ENGINE AND METHOD FOR ITS PRODUCTION

CROSS-REFERENCE TO RELATED APPLICATIONS

This is a continuation-in-part of U.S. patent application Ser. No. 13/065,511 filed on Mar. 23, 2011, which claims priority under 35 U.S.C. §119 of German Application No. 10 2010 033 878.8 filed Aug. 10, 2010 and German Application No. 10 2011 100 521.1 filed May 5, 2011, the disclosures of which are incorporated by reference.

BACKGROUND OF THE INVENTION

1. Field of the Invention

The present invention relates to a method for the production of a piston for an internal combustion engine, having a piston base body and a piston ring element. The piston base body has at least a piston skirt, and the piston ring element has at least a piston crown, a circumferential top land, and a circumferential ring belt provided with ring grooves. The piston base body and the piston ring element form a circumferential, closed cooling channel. The present invention furthermore relates to such a piston for an internal combustion engine.

2. The Prior Art

Friction-welded pistons having cooling channels in the piston head that are open toward the bottom and can be closed off by means of a sheet-metal cover are described in German Patent Application No. DE 10 2004 019 012 A1 and International Application No. WO 2007/128265 A1. In this connection, piston base body and piston ring belt each have only one joining surface. In WO 2007/128265 A1, it is proposed that the joining surfaces are not in contact over their complete area before friction welding, in order to reduce the size of the friction-welding bead that is present below the cooling channel after friction welding, in a controlled manner, so that it is easier to remove subsequent to friction welding. German Patent Application No. DE 10 2004 019 012 A1 discloses a piston base body and a piston ring element whose joining surfaces form a cavity, in order to accommodate excess material during friction welding.

However, neither of these two methods is suitable for producing pistons having a closed, circumferential cooling channel, since the typical pair of rolled-in friction-welding beads formed during friction welding projects radially into the cooling channel. These circumferential friction-welding beads take up a lot of space in the cooling channel. Thus, the volume of the cooling channel is excessively reduced, and the flow of the cooling oil in the cooling channel is hindered. In the case of pistons having a comparatively large combustion chamber bowl, the cooling channel can be configured to be so narrow, in the radial direction, that it would not even be able to accommodate the friction-welding beads.

SUMMARY OF THE INVENTION

It is therefore an object of the present invention to provide a friction-welding method for the production of a piston having a closed cooling channel, in such a manner that the cooling channel of the finished piston does not experience any excessive volume reduction.

The solution consists in a method having the following steps: (a) making available a blank of a piston base body, in which an inner joining surface and an outer joining surface and a circumferential lower cooling channel part that runs between the two joining surfaces are pre-machined; (b) making available a blank of a piston ring element, in which an inner joining surface and an outer joining surface as well as a circumferential upper cooling channel part that runs between the two joining surfaces are pre-machined; (c) forming a circumferential widened region on at least one joining surface, whereby the widened region extends toward the related cooling channel part; (d) connecting the blank of the piston base body with the blank of the piston ring element by way of their joining surfaces, by means of friction welding, to produce a piston blank; (e) machining the piston blank further and/or finish-machining it to produce a piston. The piston according to the invention has the features that the piston base body and piston ring element are connected with one another by friction welding, and the cooling channel is free of friction-welding beads, to a great extent.

In material strength studies, it has been shown that when beads are rolled in, great excessive increases in notch stress occur; these are attributable to the sharp notches at the exit of the rolled-in beads. In the case of the newly developed method listed above, these sharp edges are avoided. As a result, clear increase in strength, which ranges between 85 and 100% of the base material strength, is achieved, and thus greater freedom in designing individual designs is made possible.

The idea according to the invention consists in configuring the joining surfaces in such a manner that the region of the joining surfaces on the cooling chamber side can accommodate excess material during friction welding. As a result, the radial expanse of the cooling channel is maintained practically unchanged during friction welding, in the region of the friction-welding seam. Using the method according to the invention, it is possible to produce multi-part pistons having a closed, circumferential cooling channel that is capable of functioning, by friction-welding methods.

The present invention is suitable for all the piston construction variants according to the claims. The piston ring element or its blank can particularly have a combustion chamber bowl. The piston ring element or its blank, instead, can also have at least one wall region of a combustion chamber bowl. Then, the piston base body or its blank has at least one crown region of a combustion chamber bowl, so that the two components jointly form the complete combustion chamber bowl.

A preferred embodiment consists in that in step (d), the blank of the piston base body or the blank of the piston ring element is put into rotation, the blank of the piston base body and the blank of the piston ring element are pressed together, at a speed of rotation of 1500 rpm to 2500 rpm, at a contact pressure, with reference to the joining surfaces, of 10 N/mm$^2$ to 30 N/mm$^2$, the rotation is stopped after 1 second to 3 seconds, while maintaining the contact pressure, and subsequently, the blank of the piston base body and the blank of the piston ring element are pressed together at a contact pressure, with reference to the joining surfaces, of 100 N/mm$^2$ to 140 N/mm$^2$. These method parameters promote the avoidance of typical friction-welding beads, so that the formation of the circumferential widened region requires particularly little work effort, because of the smaller dimensions under these circumstances.

The widened regions provided according to the invention can be produced in different ways. In particular, in step (c), widened regions can be made on the inner and outer joining surface of the blank of the piston base body and/or on the inner and outer joining surface of the blank of the piston ring element.

Furthermore, the one circumferential widened region can be formed in any desired manner, for example in the form of a slanted surface, a chamfer, or a bowl. The widened regions can be formed with an axial expanse of 1.0 mm to 1.5 mm and/or with a radial expanse of at least 0.5 mm, for example.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 3b shows an enlarged detail representation of the joining region according to FIG. 3a;

FIG. 4a shows the piston according to the invention, produced from the piston blank according to FIG. 3a;

FIG. 4b shows an enlarged detail representation of the joining region of the piston according to FIG. 4a;

FIG. 7b shows an enlarged detail representation of the joining region of the piston according to FIG. 7a.

DETAILED DESCRIPTION OF THE PREFERRED EMBODIMENT

Figure 3A:
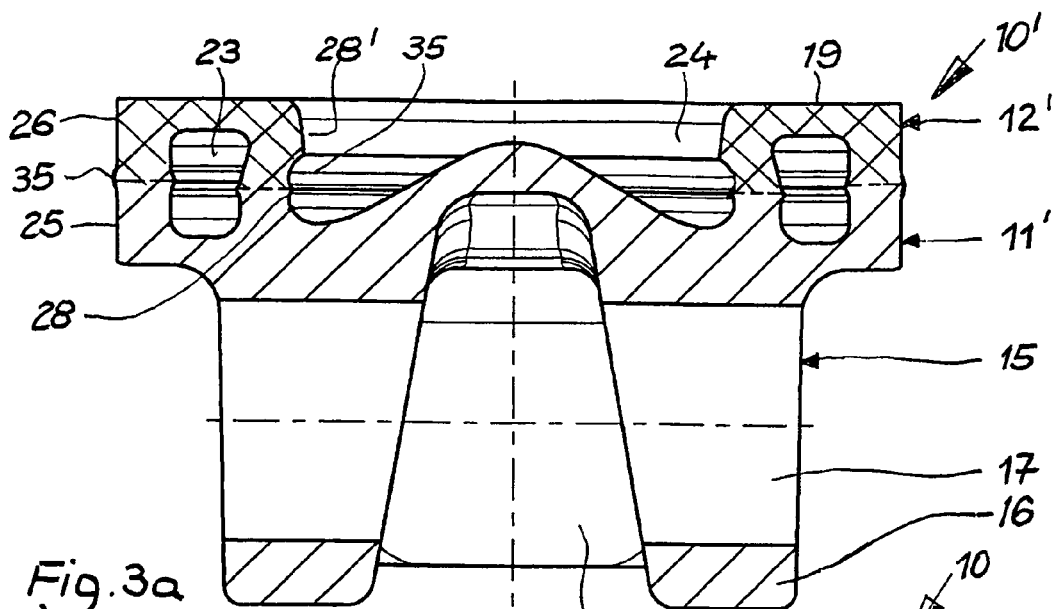
FIG. 3a shows the piston blank produced from the components according to FIG. 1, for a piston according to the invention, in section.
Figure 4A:
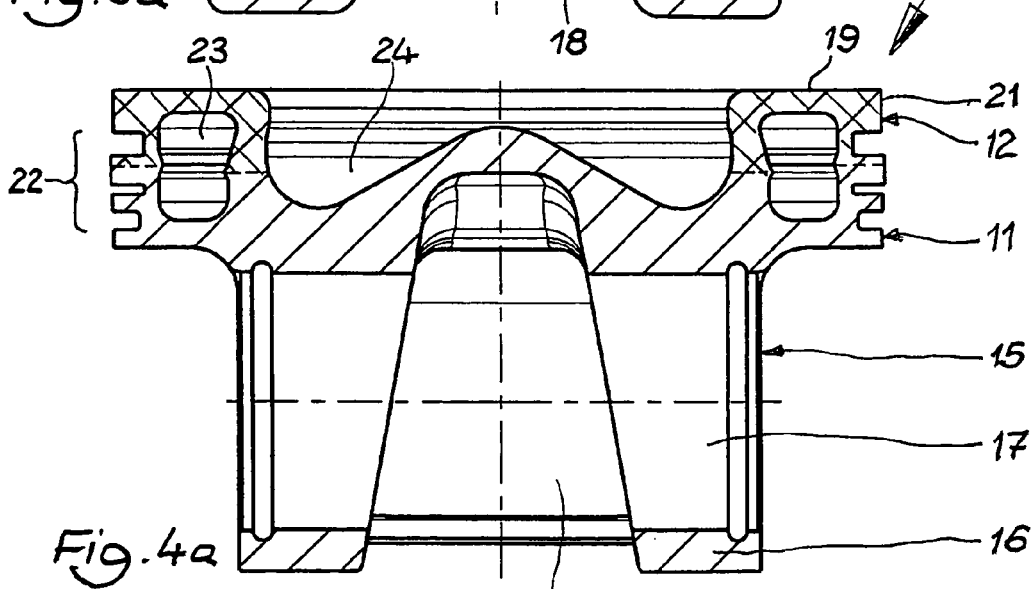
Figures 3B, 4B:
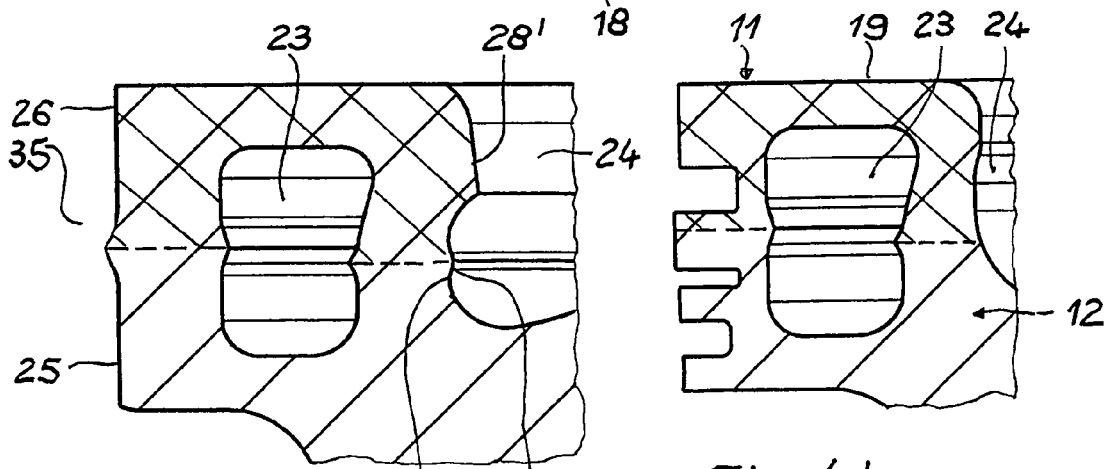

Referring now in detail to the drawings, FIGS. 4a and 4b show a finished piston 10 according to the invention. Piston 10 consists of a piston base body 11 and a piston ring element 12. The two components can consist of any metallic material, for example according to DIN EN 10083 or DIN EN 10267, which can be subjected to hardening and tempering and is suitable for friction welding.

In the exemplary embodiment, the piston base body consists of a steel material, for example AFP steel. The piston base body 11 has a piston skirt 15 that is provided, in known manner, with pin bosses 16 and pin bores 17 for accommodating a piston pin (not shown), as well as skirt regions 18 having working surfaces (not shown). In the exemplary embodiment, the piston ring element 12 is also produced from a steel material, for example 42CrMo4. The piston ring element 12 has a piston crown 19 as well as a circumferential top land 21. The piston base body 11 and the piston ring element 12 form a circumferential ring belt 22 for accommodating piston rings (not shown), a circumferential, closed cooling channel 23, as well as a combustion chamber bowl 24.

The piston base body 11 and the piston ring element 12 are connected with one another by friction welding. It is particularly evident from FIG. 4b that the circumferential, closed cooling channel 23 nevertheless does not have any typical friction-welding beads. The entire volume of the cooling channel 23, as originally provided, is therefore available for cooling the piston 10 according to the invention during engine operation. Furthermore, the flow of the cooling oil in the cooling channel is not impaired.

The piston 10 according to the invention is produced in the manner described below.

Figure 1:
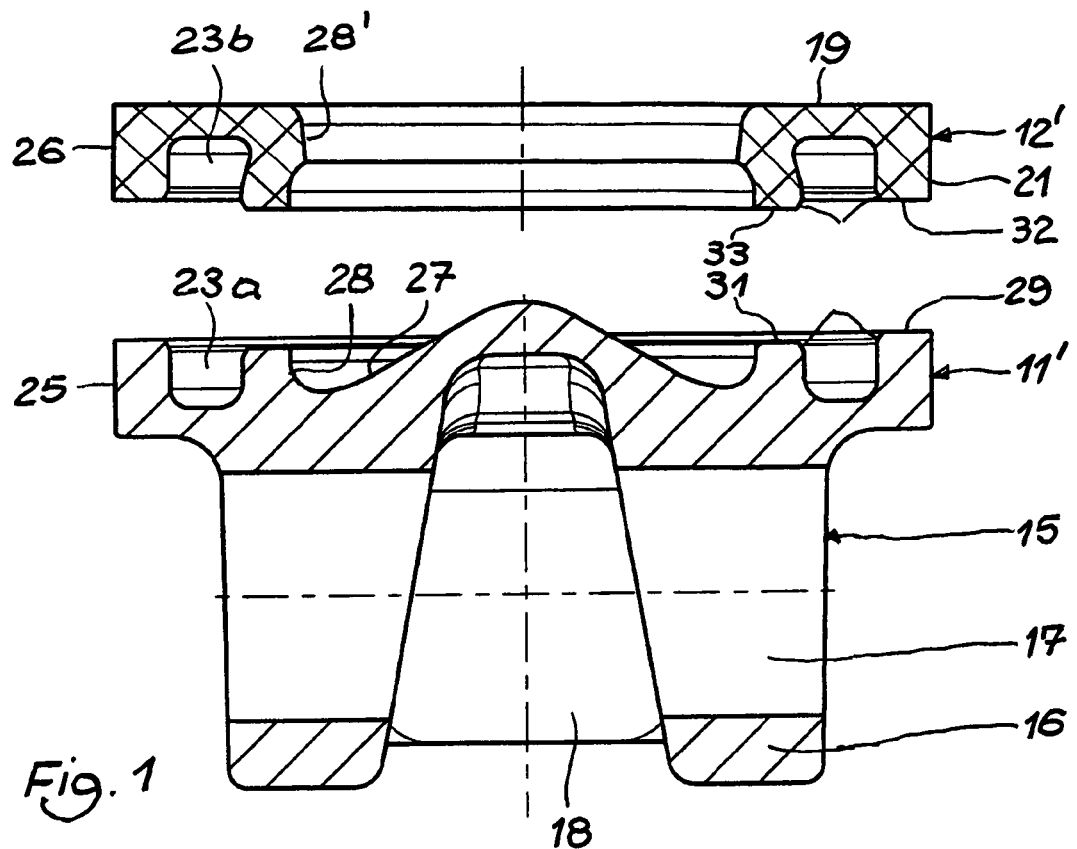
FIG. 1 shows a blank of a piston base body and of a blank of a piston ring element, for the production of a piston according to one embodiment of the invention, in section.
Figure 2:
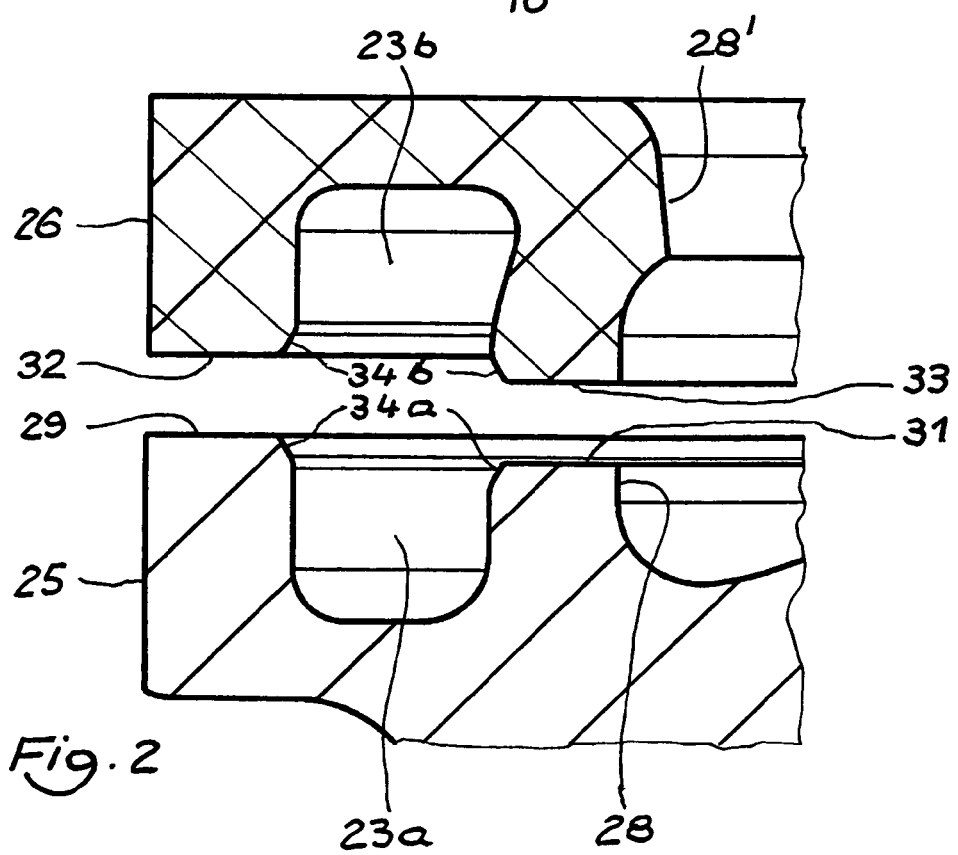
FIG. 2 shows an enlarged detail representation of the joining surface region according to FIG. 1.

According to FIGS. 1 and 2, first a pre-machined blank 11' of a piston base body 11 as well as a pre-machined blank 12' of a piston ring element 12 are made available. The blanks 11', 12' essentially correspond to the finished piston base body 11 and the finished piston ring element 12, respectively, so that the same structures are provided with the same reference symbols, and in this regard, reference is made to the above description of FIG. 4a. The essential difference consists in that no ring belt is machined out, but rather a smooth mantle surface 25 on the blank 11' of the piston base body 11 as well as a smooth mantle surface 26 on the blank 12' of the piston ring element 12 are provided.

The blanks 11', 12' can be cast, forged, or sintered by means of powder metallurgy, depending on the selection of the material. In the exemplary embodiment, the crown region 27 a part 28 of the wall region of the combustion chamber bowl 24 is pre-machined, for example lathed, into the blank 11' of the piston base body 11. Furthermore, a circumferential cooling channel part 23a of the cooling channel 23 is pre-machined. This results in an outer joining surface 29 and an inner joining surface 31. In the exemplary embodiment, the remaining part 28' of the wall region of the combustion chamber bowl is machined, for example lathed, into the blank 12' of the piston ring element 12. Furthermore, a circumferential upper cooling channel part 23b of the cooling channel 23 is machined in. This results in an outer joining surface 32 and an inner joining surface 33. The outer joining surface 29 of the blank 11' corresponds to the outer joining surface 32 of the blank 12'. In corresponding manner, the inner joining surface 31 of the blank 11' corresponds to the inner joining surface 33 of the blank 12'. This means that the two blanks 11', 12' can be connected with one another along their joining surfaces 29, 31 and 32, 33, respectively, to form a piston blank 10'.

In the exemplary embodiment, a circumferential widened region 34a, 34b, in the form of a chamfer, is formed out at the two joining surfaces 29, 31 of the blank 11' as well as at the two joining surfaces 32, 33 of the blank 12', in each instance. The widened regions 34a, 34b extend in the direction of the cooling channel part 23a of the blank 11'. In corresponding manner, the widened regions 34b extend in the direction of the cooling channel part 23b of the blank 12'. The maximal axial expanse of the widened regions 34a, 34b each amounts to about 1.0 mm in the exemplary embodiment, while the radial expanse of each of the widened regions 34a, 34b amounts to about 0.5 mm. When the joining surfaces 29, 31 and 32, 33, respectively, of the blanks 11', 12' come into contact with one another at the beginning of the friction-welding process (see below), the widened regions 34a, 34b form two joins, in the exemplary embodiment, that lie opposite one another, having a maximal axial expanse of about 2 mm, which can accommodate excess material. Of course, widened regions having a different geometry can also be combined with one another.

To connect the two blanks 11', 12', these are braced so as to align, in known manner. Then, one of the two blanks 11', 12' is put into rotation, until a speed of rotation of 1,500 rpm to 2,500 rpm is achieved. Now, the blanks 11', 12' are brought into contact with one another by way of their joining surfaces 29, 31 and 32, 33, respectively, and pressed together at a constant initial contact pressure, with reference to the joining surfaces 29, 31 and 32, 33, respectively, of 10 N/mm$^2$ to 30 N/mm$^2$. The rotational movement and the constant contact pressure produce a friction that heats up the joining surfaces 29, 31 and 32, 33, respectively. The speed of rotation and the contact pressure are selected in such a manner, as a function of the materials used, so that the joining surfaces 29, 31 and 32, 33, respectively, heat up to a temperature close to the melting point of the material or the materials. When this has been reached (after 1 to 3 seconds, depending on the material or materials), the rotation is ended, while maintaining the initial contact pressure, i.e. the spindle used for rotation is braked and stopped as quickly as possible (within less than 1 second, if at all possible). During this process, the contact pressure is maintained. After movement has been stopped, the contact pressure is increased to a joining pressure, with reference to the joining surfaces 29, 31 and 32, 33, respectively, that is a multiple of the initial contact pressure, of 100 N/mm$^2$ to 140 N/mm$^2$, and the blanks 11', 12' are pressed together under this joining pressure for about 5 seconds. In this connection, the excess material is taken up into the joins described above.

FIGS. 3a and 3b show the piston blank 10' that has been produced in this manner. The piston blank 10' essentially corresponds to the finished piston 10, so that the same structures are provided with the same reference symbols, and reference is made to the above description of FIG. 4a in this regard. As the result of the friction-welding process described above, the piston blank 10' does not have any typical friction-welding bead 35 along the friction-welding seams as well as on the mantle surfaces 25, 26 of the blanks 11' and 12', respectively, as well as on the wall region 28, 28', in each instance. It can particularly be seen in FIG. 3b that the cooling channel 23 formed from the cooling channel parts 23a, 23b of the blanks 11' and 12', respectively, does not have any typical rolled-in friction-welding beads along the friction-welding seams. The melted, excess material released during the friction-welding process described above, which would form rolled-in friction-welding beads in the state of the art, was accommodated by the joins by the widened regions 34a, 34b, during the friction-welding process.

The piston blank 10' is machined further or machine-finished in known manner, depending on the configuration of the blanks 11', 12'. For example, the outer shape, surfaces, combustion chamber bowl, pin bores, etc. can be machine-finished. In particular, the ring belt 22 is machined in, and the friction-welding beads 35 are removed. In the end result, the finished piston according to FIGS. 4a and 4b, as described above, is obtained.

Figure 5:
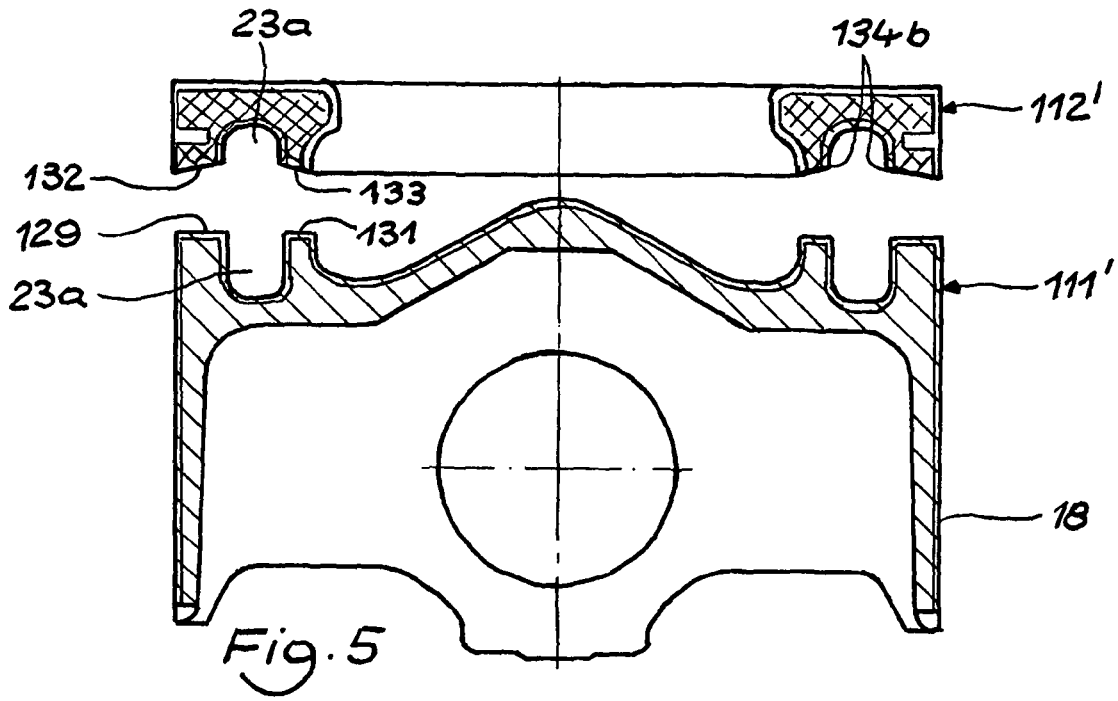
FIG. 5 shows a blank of a piston base body and of a blank of a piston ring element for the production of a piston according to another embodiment of the invention, in section.

FIG. 5 shows an alternative embodiment of a blank 111' of a piston base body 11, as well as of a blank 112' of a piston ring element 12 for a piston 10 according to the invention. The blanks 111', 112' essentially correspond to blanks 11', 12' according to FIG. 1, so that the same structures are provided with the same reference symbols, and reference is made to the above description of FIG. 1 in this regard. It is pointed out that the representation according to FIG. 5 is rotated by 90° as compared with the representation according to FIG. 1.

Analogous to the blanks 11', 12' according to FIG. 1, the blank 111' has an outer joining surface 129, and the blank 112' has a corresponding outer joining surface 132. Also analogous to the blanks 11', 12' according to FIG. 1, the blank 111' has an inner joining surface 131, and the blank 112' has a corresponding inner joining surface 133. This means that the two blanks 111', 112' can be connected with one another along their joining surfaces 129, 131 and 132, 133, respectively, to produce a piston blank 110'.

In the exemplary embodiment, a circumferential widened region 134b in the form of a slant is formed on both joining surfaces 132, 133 of the blank 112' of the piston ring element 12, in each instance. The widened regions 134b extend in the direction of the cooling channel part 23b of the blank 112'. The maximal axial expanse of each of the widened regions 134b amounts to about 1 mm, in the exemplary embodiment. When the joining surfaces 129, 131 and 132, 133, respectively, come into contact with one another, at the beginning of the friction-welding process described above, the widened regions 134b form a clear space, in the exemplary embodiment, in the shape of a right triangle, with a maximal axial expanse of about 1 mm, in which the melted material is distributed. Of course, widened regions having a different geometry can also be combined with one another.

Figure 6:
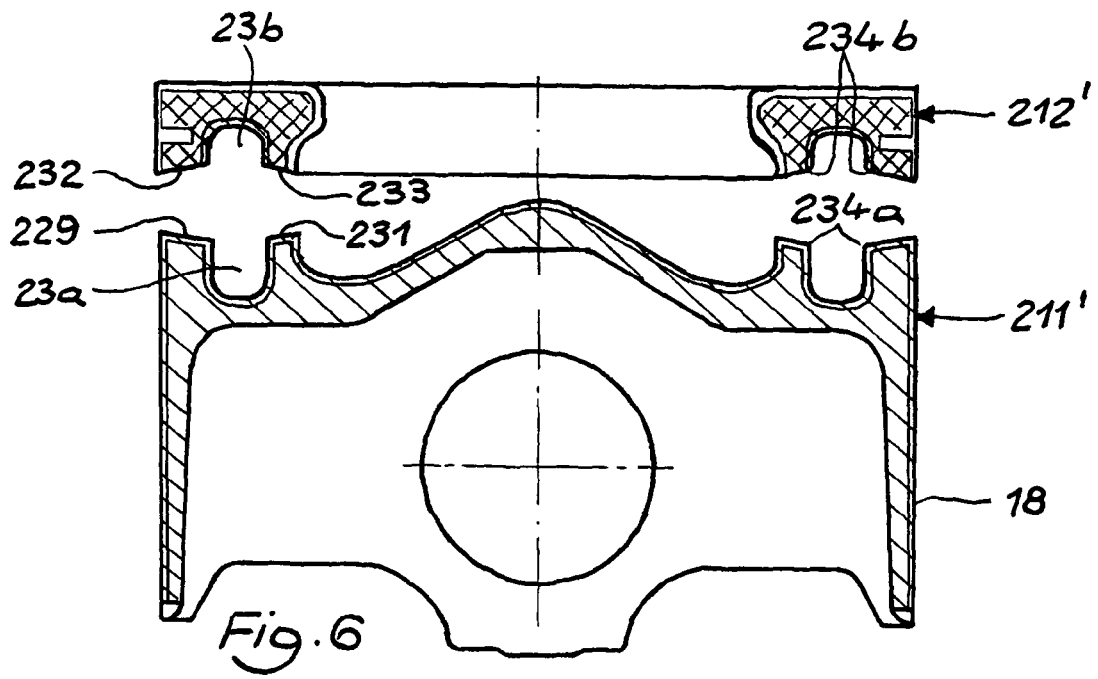
FIG. 6 shows another exemplary embodiment of a blank of a piston base body and of a blank of a piston ring element for the production of a piston according to the invention, in section.

FIG. 6 shows a further exemplary embodiment 211' of a piston base body 11, as well as of a blank 212' of a piston ring element 12 for a piston 10 according to the invention. The blanks 211', 212' essentially correspond to the blanks 11', 12' according to FIG. 1, so that the same structures are provided with the same reference symbols, and reference is made to the above description of FIG. 1 in this regard. It is pointed out that the representation according to FIG. 6 is rotated by 90° as compared with the representation according to FIG. 1.

Analogous to the blanks 11', 12' according to FIG. 1, the blank 211' has an outer joining surface 229, and the blank 212' has a corresponding outer joining surface 232. Also analogous to the blanks 11', 12' according to FIG. 1, the blank 211' has an inner joining surface 231, and the blank 212' has a corresponding inner joining surface 233. This means that the two blanks 211', 212' can be connected with one another along their joining surfaces 229, 231 and 232, 233, respectively, to produce a piston blank 110'.

In the exemplary embodiment, a circumferential widened region 234a, 234b in the form of a slant is formed on both joining surfaces 229, 231 of the blank 211' as well as on both joining surfaces 232, 233 of the blank 212'. The widened regions 234b extend in the direction of the cooling channel part 23a of the blank 211'. In corresponding manner, the widened regions 234b extend in the direction of the cooling channel part 23b of the blank 212'. The maximal axial expanse of each of the widened regions 234a, 234b amounts to about 1 mm, in the exemplary embodiment. When the joining surfaces 229, 231 and 232, 233, respectively, of the blanks 211', 212' come into contact with one another, at the beginning of the friction-welding process described above, the widened regions 234a, 234b form two clear spaces that lie opposite one another, in the exemplary embodiment, in the shape of an equilateral triangle, with a maximal axial expanse of about 2 mm, in which the melted material is distributed. Of course, widened regions having a different geometry can also be combined with one another.

Figure 7A:
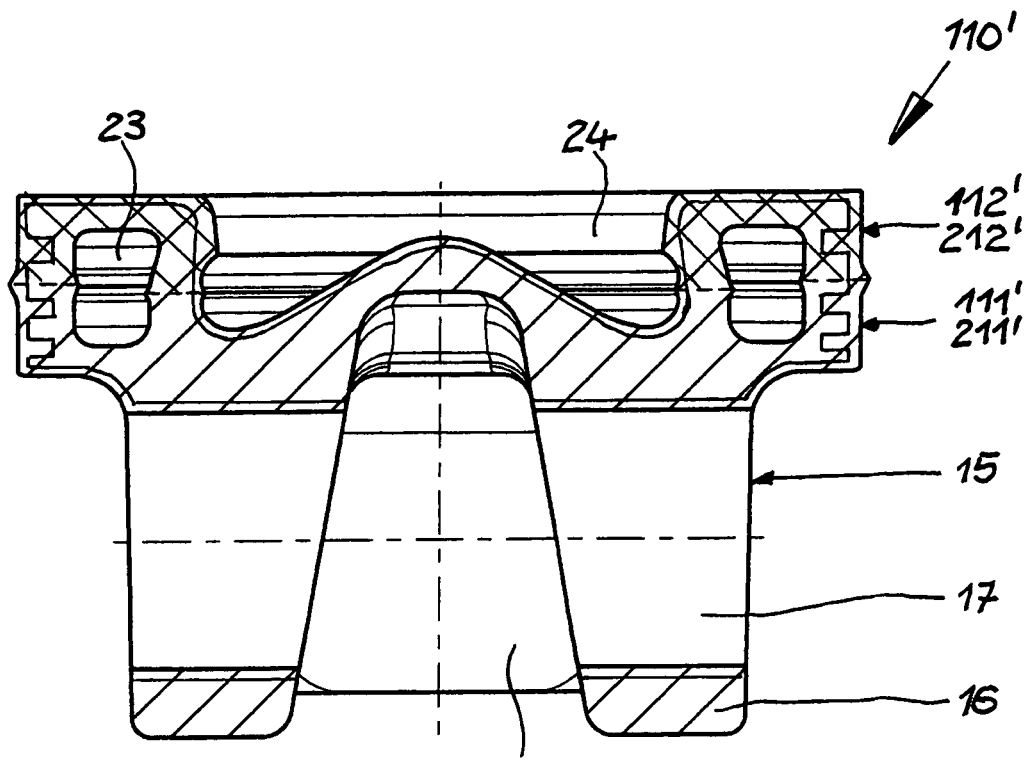
FIG. 7a shows the piston blank produced from the components according to FIG. 5 and FIG. 6, respectively, for a piston according to the invention, in section.
Figure 7B:
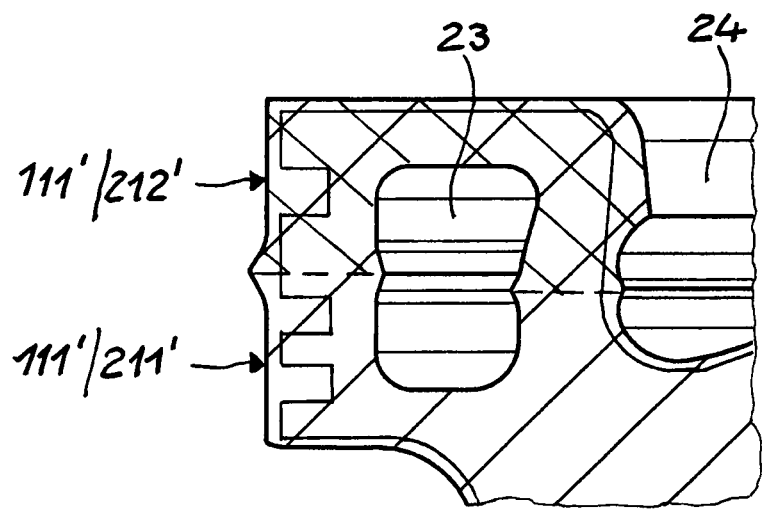

With the friction-welding method described above, essentially the same piston blank 110' as the one shown in FIGS. 7a and 7b is obtained from the blanks 111', 112' according to FIG. 5 and from the blanks 211', 212' according to FIG. 6. The piston blank 110' essentially corresponds to the piston blank 10' according to FIGS. 3a and 3b, so that the same structures are provided with the same reference symbols, and reference is made to the above description of FIG. 3a in this regard. As the result of the friction-welding process described above, the piston blank 110' has the friction-welding beads or thickened regions shown in FIG. 7b. Also in the cooling channel 23 formed from the cooling channel parts 23a, 23b of the blanks 111' and 112', respectively, as well as the blanks 211' and 212', respectively, contains friction-welding beads or thickened regions, as indicated above. The melted, excess material released during the friction-welding process described above, which would form friction-welding beads in the state of the art, was taken up by the clear spaces formed by the widened regions 134b or 234a, 234b, respectively, so that a distribution of the melted material occurs, which ensures that the friction-welding beads or thickened regions, which are formed in the direction toward the cooling chamber, are smaller than the friction-welding beads or thickened regions that are situated on the sides facing away from the cooling chamber.

The piston ring 110' is machined further or machine-finished in known manner, depending on the configuration of the blanks 111', 112' or the blanks 211' 212', respectively. For example, the outer shape, surfaces, combustion chamber bowl, pin bores, etc. can be machine-finished. In particular, the ring belt 22 is machined in. In the end result, the finished piston 10, as described above in connection with FIGS. 4a and 4b, is obtained.

Accordingly, while only a few embodiments of the present invention have been shown and described, it is obvious that many changes and modifications may be made thereunto without departing from the spirit and scope of the invention.

What is claimed is:

1. A method for the production of a piston for an internal combustion engine, having a piston base body and a piston ring element, the piston base body having at least a piston skirt and the piston ring element having at least a piston crown, a circumferential top land, and a circumferential ring belt provided with ring grooves, wherein the piston base body and the piston ring element form a circumferential, closed cooling channel, the method comprising the following steps:

(a) providing a blank of a piston base body, in which an outer joining surface and an inner joining surface as well as a circumferential lower cooling channel part that runs between the two joining surfaces are pre-machined, (b) providing a blank of a piston ring element, in which an outer joining surface and an inner joining surface as well as a circumferential upper cooling channel part that runs between the two joining surfaces are pre-machined, (c) forming a circumferential widened region on the inner and outer joining surface of at least one of the blank of the piston base body and the blank of the piston ring element, the widened regions extending toward the related cooling channel part, (d) connecting the blank of the piston base body with the blank of the piston ring element by way of their joining surfaces by means of friction welding, to produce a piston blank, wherein the blank of the piston base body or the blank of the piston ring element is put into rotation, the blank of the piston base body and the blank of the piston ring element are pressed together, at an initial contact pressure with reference to the joining surface, the rotation is stopped, while maintaining the initial contact pressure, and after the rotation has come to a stop, the contact pressure is immediately increased to a multiple of the initial contact pressure, to metallurgically connect the blank of the piston base body and the blank of the piston ring element, and (e) machining the piston blank further or finish-machining the piston blank to produce a piston.

2. The method according to claim 1, wherein the blank of the piston ring element has a combustion chamber bowl.

3. The method according to claim 1, wherein the blank of the piston ring element has at least one wall region of a combustion chamber bowl, and the blank of the piston base body has at least one crown region of a combustion chamber bowl.

4. The method according to claim 1, wherein the rotation takes place at a speed of rotation of 1500 rpm to 2500 rpm, under an initial contact pressure of 10 N/mm2 to 30 N/mm2, and wherein the rotation is stopped after 1 second to 3 seconds, while maintaining the initial contact pressure.

5. The method according to claim 1, wherein after the rotation has stopped, the blank of the piston base body and the blank of the piston ring element are pressed together at a joining pressure, with reference to the joining surfaces, of 100 N/mm2 to 140 N/mm2.

6. The method according to claim 1, wherein in step (c), the circumferential widened regions are formed in the form of a slanted surface.

7. The method according to claim 1, wherein the widened regions are formed with an axial expanse of 1.0 mm to 1.5 mm and/or with a radial expanse of at least 0.5 mm.

8. A piston produced according to a method of claim 1.

* * * * *